United States Patent
Umeda et al.

(10) Patent No.: US 12,232,046 B2
(45) Date of Patent: Feb. 18, 2025

(54) TERMINAL AND UPLINK TRANSMISSION METHOD

(71) Applicant: NTT DOCOMO, INC., Tokyo (JP)

(72) Inventors: Hiromasa Umeda, Tokyo (JP); Yuta Oguma, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 353 days.

(21) Appl. No.: 17/793,829

(22) PCT Filed: Jan. 31, 2020

(86) PCT No.: PCT/JP2020/003812
§ 371 (c)(1),
(2) Date: Jul. 19, 2022

(87) PCT Pub. No.: WO2021/152857
PCT Pub. Date: Aug. 5, 2021

(65) Prior Publication Data
US 2023/0046526 A1 Feb. 16, 2023

(51) Int. Cl.
| | |
|---|---|
| *H04W 52/18* | (2009.01) |
| *H04W 52/34* | (2009.01) |
| *H04W 52/36* | (2009.01) |
| *H04W 52/42* | (2009.01) |
| *H04W 76/15* | (2018.01) |
| *H04W 84/20* | (2009.01) |

(52) U.S. Cl.
CPC ........... *H04W 52/18* (2013.01); *H04W 52/36* (2013.01)

(58) Field of Classification Search
None
See application file for complete search history.

(56) References Cited

U.S. PATENT DOCUMENTS

| | | | |
|---|---|---|---|
| 6,259,685 B1* | 7/2001 | Rinne | H04W 52/34 370/348 |
| 11,388,684 B2* | 7/2022 | Frank | H04W 52/367 |
| 2022/0116891 A1* | 4/2022 | Yao | H04W 52/42 |
| 2023/0262783 A1* | 8/2023 | Zhou | H04W 74/0866 370/329 |
| 2023/0345446 A1* | 10/2023 | Popp | H04W 52/365 |

(Continued)

OTHER PUBLICATIONS

International Search Report issued in PCT/JP2020/003812 on Aug. 25, 2020 (3 pages).

(Continued)

*Primary Examiner* — Pablo N Tran
(74) *Attorney, Agent, or Firm* — Osha Bergman Watanabe & Burton LLP

(57) ABSTRACT

A terminal including: a control unit configured to compare a power reduction total value that is reduced from a maximum transmission power value determined based on a power class and that does not include a power reduction value for adjusting the power class with a predetermined value, and to calculate a lower limit value of a maximum transmission power by setting the power reduction value for adjusting the power class as 0 dB when the power reduction total value is greater than the predetermined value; and a transmission unit configured to perform uplink transmission using a maximum transmission power value equal to or greater than the lower limit value.

5 Claims, 6 Drawing Sheets

(56) References Cited

U.S. PATENT DOCUMENTS

2024/0073830 A1* 2/2024 Sridharan ........... H04W 52/146

OTHER PUBLICATIONS

Written Opinion of the International Searching Authority issued in PCT/JP2020/003812 on Aug. 25, 2020 (3 pages).
3GPP TS 38.213 V15.8.0; "3rd Generation Partnership Project; Technical Specification Group Radio Access Network; NR; Physical layer procedures for control (Release 15)"; Dec. 2019 (110 pages).
3GPP TS 38.331 V15.8.0; "3rd Generation Partnership Project; Technical Specification Group Radio Access Network; NR; Radio Resource Control (RRC) protocol specification (Release 15)"; Dec. 2019 (532 pages).
3GPP TS 38.101-1 V15.8.0; "3rd Generation Partnership Project; Technical Specification Group Radio Access Network; NR; User Equipment (UE) radio transmission and reception: Part 1: Range 1 Standalone (Release 15)"; Dec. 2019 (236 pages).

* cited by examiner

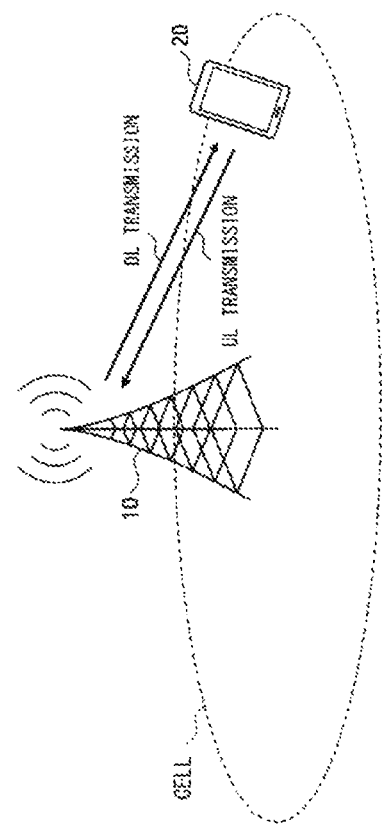
[FIG. 1]

[FIG. 2]
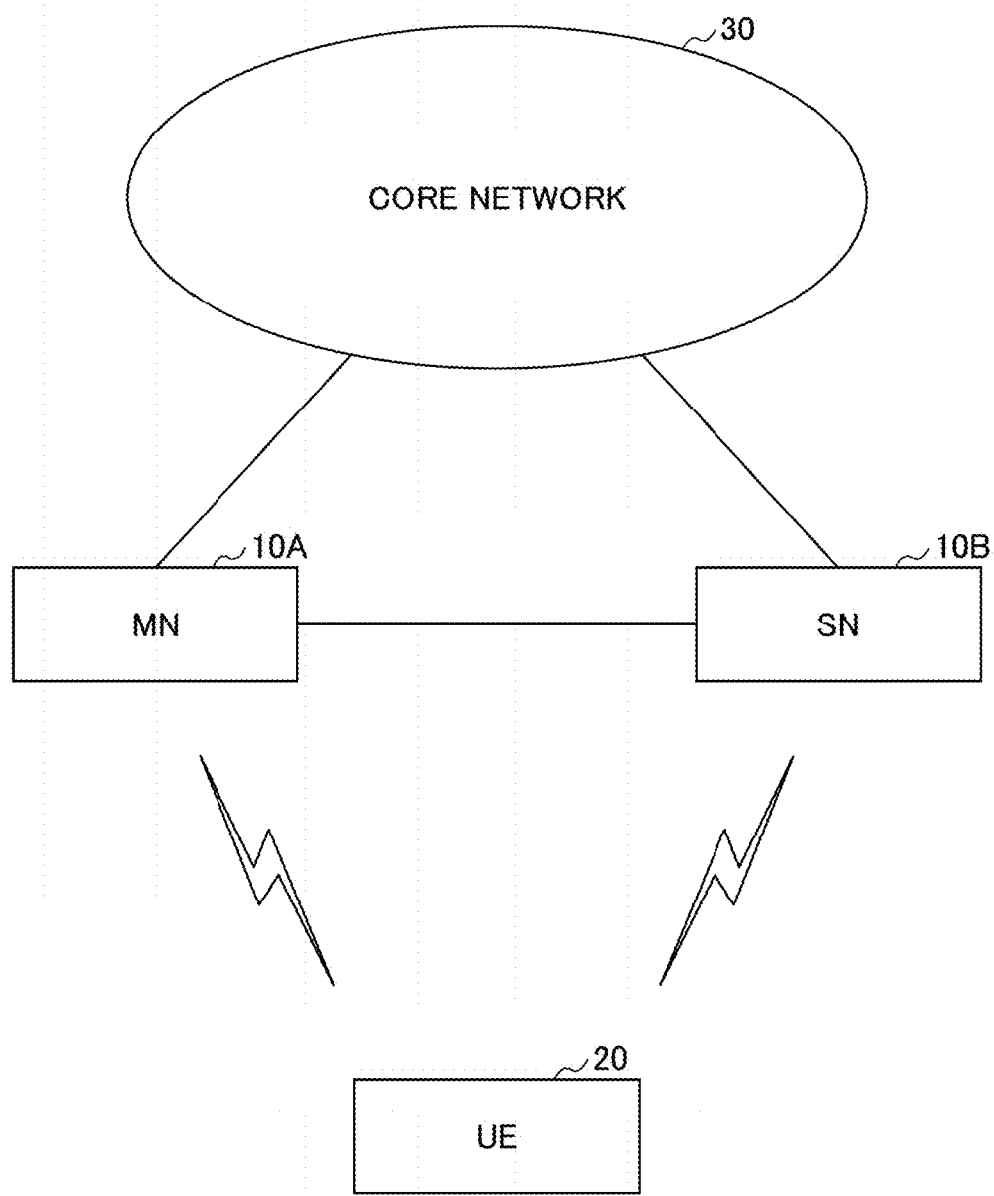

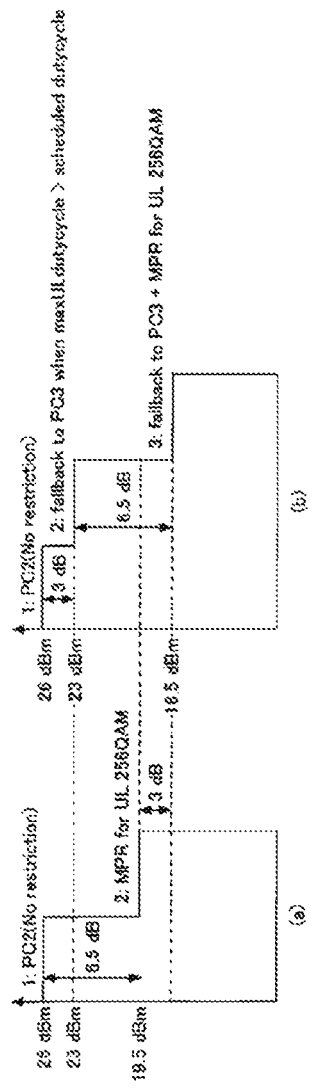
[FIG. 3]

[FIG. 4]
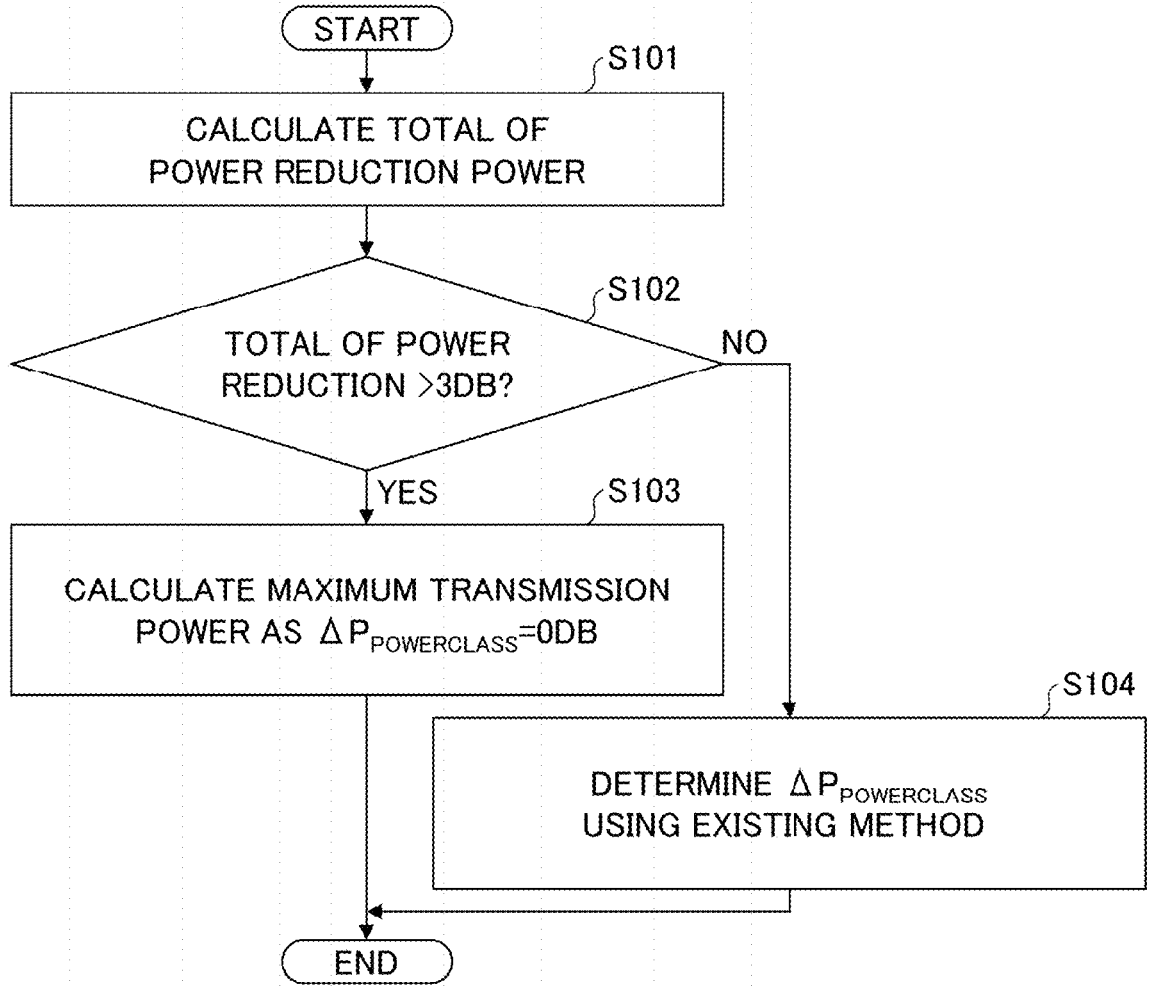
[FIG. 5]

[FIG. 6]
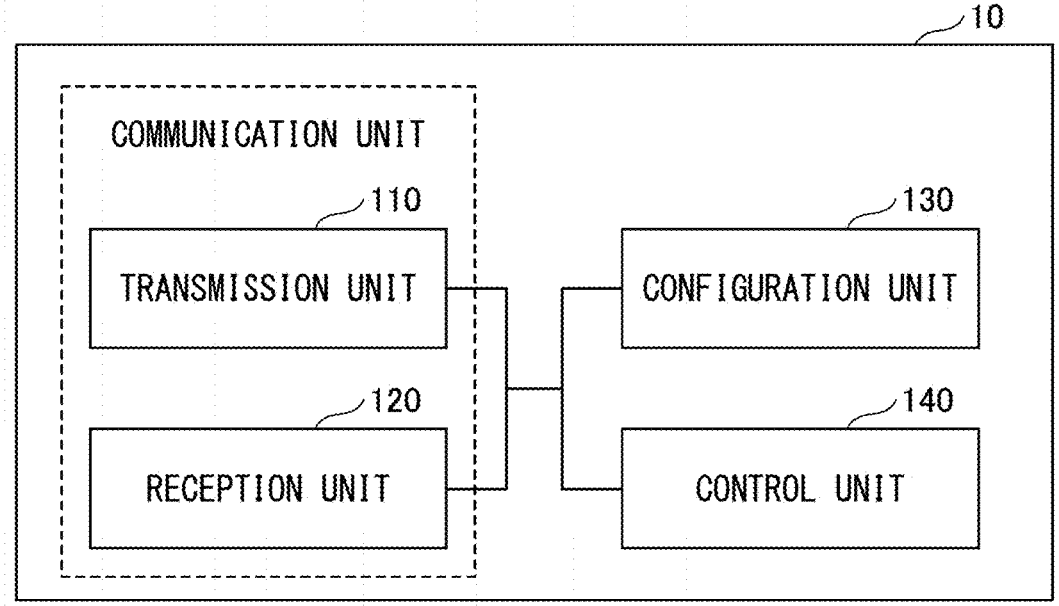
[FIG. 7]
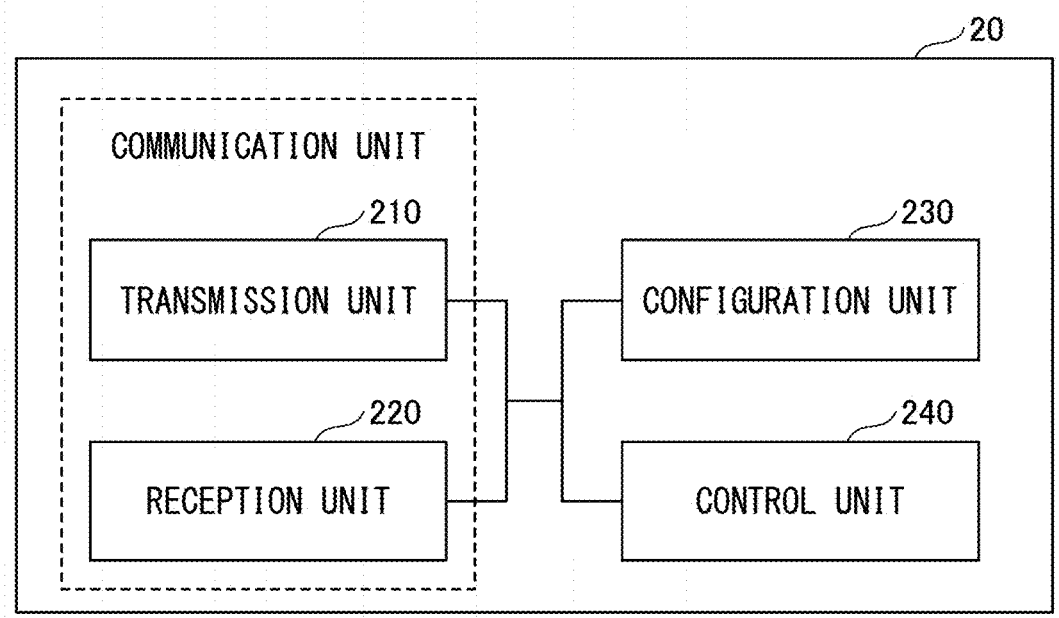

[FIG. 8]
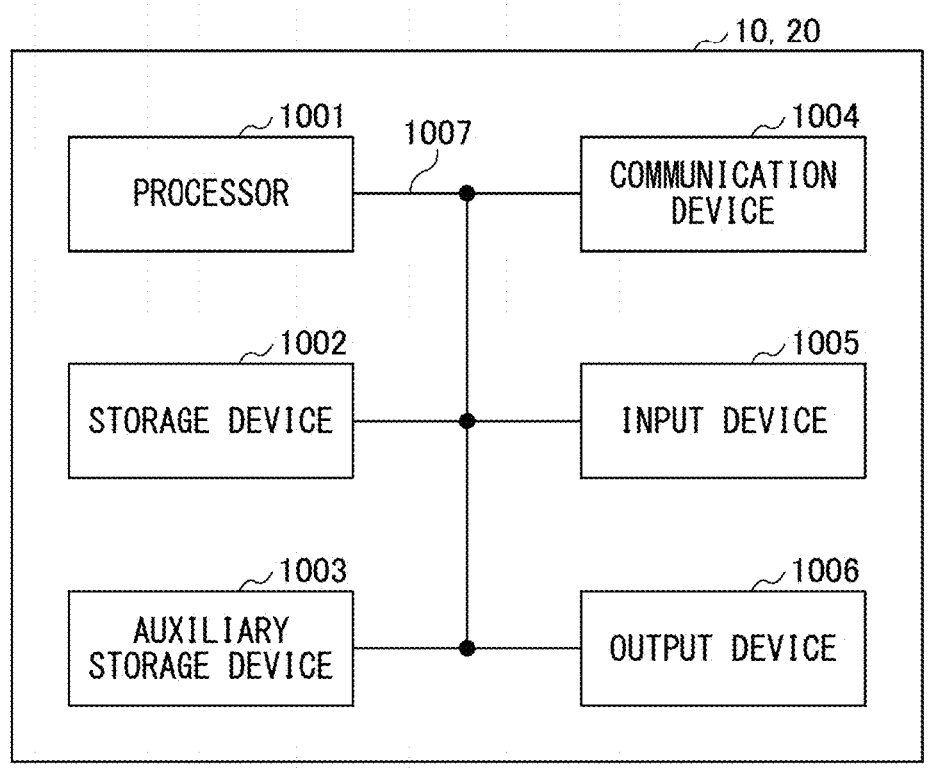

TERMINAL AND UPLINK TRANSMISSION METHOD

TECHNICAL FIELD

The present invention relates to a terminal in a wireless communication system.

BACKGROUND ART

In NR (New Radio), a successor system to the Long Term Evolution (LTE) (also referred to as "5G"), technologies that satisfy requirements such as high capacity systems, high data transmission rate, low delay, simultaneous connection of multiple terminals, low cost, and power saving are being considered.

In addition, In NR, a user terminal (HPUE: High Power UE) that transmits by high power for coverage expansion is being studied.

PRIOR ART DOCUMENTS

Non-Patent Document

[Non-Patent Document 1] 3GPP TS 38. 101-1 V15. 8. 0 (2019 December)
[Non-Patent Document 2] 3GPP TS 38. 331 V15. 8. 0 (2019 December)
[Non-Patent Document 3] 3GPP TS 38. 213 V15. 8. 0 (2019 December)

SUMMARY OF INVENTION

Problem to be Solved by the Invention

As an example of HPUE, a user terminal of Power class 2 with a maximum transmission power value of 26 dBm is specified. The user terminal of the power class 2 falls back to the maximum transmission power value (23 dBm) of the power class 3 when frequency of uplink transmission is higher than a predetermined value (Non-Patent Document 1, etc.).

However, there is a problem in existing technologies in which reduction of the maximum transmission power value may be unnecessarily allowed when performing fallback of power class. In other words, there is a problem that the maximum transmission power value cannot be determined appropriately. This problem is not limited to NR, and can occur not only in user terminals of Power class 2.

The present invention has been made in view of the above-described points, and is intended to provide a technique for preventing the maximum transmission power value of the user terminal from being reduced unnecessarily.

Means for Solving Problems

According to the disclosed technique, there is provided a terminal including: a control unit configured to compare a power reduction total value that is reduced from a maximum transmission power value determined based on a power class and that does not include a power reduction value for adjusting the power class with a predetermined value, and to calculate a lower limit value of a maximum transmission power by setting the power reduction value for adjusting the power class as 0 dB when the power reduction total value is greater than the predetermined value; and a transmission unit configured to perform uplink transmission using a maximum transmission power value equal to or greater than the lower limit value.

Effects of the Invention

According to the disclosed technique, a technique is provided to prevent the maximum transmit power value of the user terminal from being unnecessarily reduced.

BRIEF DESCRIPTION OF DRAWINGS

FIG. 1 is a diagram for explaining a wireless communication system according to an embodiment of the present invention;
FIG. 2 is a diagram for explaining a wireless communication system according to an embodiment of the present invention;
FIG. 3 is a diagram for explaining an outline of an embodiment of the present invention;
FIG. 4 is a flowchart for explaining an operation example of Example 1;
FIG. 5 is a diagram showing the relationship between $\Delta P_{PowerClass}$ and $MAX(MAX(MPR_c, A\text{-}MPR_c) + \Delta T_{IB,c} + \Delta T_{C,c} + \Delta T_{RxSRS}, P\text{-}MPR_c)$ in Example 2;
FIG. 6 is a diagram showing an example of a functional configuration of the base station apparatus 10 according to an embodiment of the present invention;
FIG. 7 is a diagram showing an example of a functional configuration of a user terminal 20 according to an embodiment of the present invention;
FIG. 8 is a diagram illustrating an example of the hardware configuration of the base station apparatus 10 or the user terminal 20 according to an embodiment of the present invention.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. The existing technology is, for example, an existing NR. The wireless communication system (the base station apparatus 10 and the user terminal 20) according to the present embodiment basically operates according to the existing specification (for example, Non-Patent Documents 1, 2, and 3). However, in order to solve the problem of the existing art in which the maximum transmission power value may be reduced unnecessarily, the user terminal 20 performs operations not included in the existing specification. In the description of the present embodiment (including Example 1, Example 2, and other examples), operations not included in the existing provisions are mainly described. All the values described below are examples.

In embodiments of the present invention, the duplex method may be a TDD (Time Division Duplex) method, a FDD (Frequency Division Duplex) method, or any other method (e.g., Flexible Duplex, etc.).

In an embodiment of the present invention, "wireless parameter or the like being configured" may mean that a predetermined value is preconfigured or that a wireless parameter notified from the base station apparatus 10 or the user terminal 20 is configured.

(System Configuration)

FIG. 1 is a diagram illustrating a wireless communication system according to an embodiment of the present invention. The wireless communication system in an embodiment of the present invention includes a base station apparatus 10 and a user terminal 20, as shown in FIG. 1. In FIG. 1, one base station apparatus 10 and one user terminal 20 are shown, but this is an example and may be more than one for each of them. The user terminal 20 may be referred to as a "terminal."

The base station apparatus 10 is a communication device that provides one or more cells and performs wireless communication with the user terminal 20. The physical resources of the radio signal are defined in a time domain and a frequency domain.

For example, OFDM is used as the wireless access scheme. In the frequency domain, As subcarrier spacing (SCS), at least 15 kHz, 30 kHz, 120 kHz, and 240 kHz are supported. In addition, resource blocks are constructed by a predetermined number of consecutive subcarriers (e.g., 12) regardless of SCS.

The user terminal 20 detects an SSB (SS/PBCH block) and identifies an SCS for PDCCH and PDSCH based on PBCH included in the SSB when making the initial access.

In the time domain, a slot is configured by a plurality of OFDM symbols (e.g., 14 regardless of subcarrier spacing). A slot is a scheduling unit. In addition, a subframe of 1 ms interval is defined, and a frame of 10 subframes is defined. The number of symbols per slot is not limited to 14.

As shown in FIG. 1, the base station apparatus 10 transmits control information or data in DL (Downlink) to the user terminal 20 and receives control information or data in UL (Uplink) from the user terminal 20. Both the base station apparatus 10 and the user terminal 20 are capable of beam forming to transmit and receive signals. Also, both the base station apparatus 10 and the user terminal 20 can apply communication by MIMO (Multiple Input Multiple Output) to DL or UL. The base station apparatus 10 and the user terminal 20 may both communicate via a SCell (Secondary Cell) and a PCell (Primary Cell) by a CA (Carrier Aggregation)

The user terminal 20 is a communication device, having a wireless communication function, such as a smartphone, a cellular phone, a tablet, a wearable terminal, a communication module for M2M (Machine-to-Machine), or the like. As shown in FIG. 1, the user terminal 20 utilizes various communication services provided by the wireless communication system by receiving control information or data in DL from the base station apparatus 10 and transmitting control information or data in UL to the base station apparatus 10.

FIG. 2 shows an example of a configuration of a wireless communication system when NR-DC (NR-Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The user terminal 20 communicates with both the base station apparatus 10A and the base station apparatus 10B.

The cell group provided by the base station apparatus 10A that is an MN is called MCG (Master Cell Group), and the cell group provided by the base station apparatus 10B that is an SN is called SCG (Secondary Cell Group). The operation according to this embodiment may be performed in any one configuration of FIGS. 1 and 2, or may be performed in a configuration other than that shown in FIGS. 1 and 2.

In the wireless communication system according to this embodiment, when an unlicensed band is used, an LBT (Listen Before Talk) is executed. The base station apparatus 10 or the user terminal 20 transmits when the LBT result is idle, and does not transmit when the LBT result is busy.

(Maximum Transmission Power Value)

The user terminal 20 according to the present embodiment is assumed to support power class 2. For example, as described in Non-Patent Document 1, the power class defines the maximum transmission power (maximum output power) as a capability of the user terminal, and the maximum transmission power of the power class 2 is 26 dBm. In this specification, the "maximum transmission power" may be referred to as the "maximum output power."

As an example, the user terminal 20 determines a range ($P_{CMAX,f,c}$ (configured maximum output power)) of the maximum transmission power value of a serving cell c in a carrier f in each slot according to the following Equations 1 to 3 (Non-Patent Document 1, 6.2.4).

$$P_{CMAX\_L,f,c} \leq P_{CMAX,f,c} \leq P_{CMAX\_H,f,c} \qquad \text{(Equation 1)}$$

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c, A\text{-}MPR_c) + \Delta T_{IB,c} + \Delta T_{C,c} + \Delta T_{RxSRS}, P\text{-}MPR_c)\} \qquad \text{(Equation 2)}$$

$$P_{CMAX\_H,f,c} = \text{MIN}\{P_{EMAX,c}, P_{PowerClass} - \Delta P_{PowerClass}\} \qquad \text{(Equation 3)}$$

MIM (A, B) means to output the smaller one of A and B (if they are the same, either one of them), while MAX (A, B) means to output the larger one of A and B (if they are the same, either one of them).

In this specification, the term "MAX(MAX($MPR_c$, A-$MPR_c$)+$\Delta T_{IB,c}$+$\Delta T_{C,c}$+$\Delta T_{RxSRS}$,P-$MPR_c$)" in the above-described formula 2 may be replaced with "MAX($MPR_c$+A-$MPR_c$+$\Delta T_{IB,c}$+$\Delta T_{C,c}$+$\Delta T_{RxSRS}$,P-$MPR_c$)." That is, the "total power reduction value without the power reduction value for adjusting power supply" described below may be "MAX ($MPR_c$+A-$MPR_c$+$\Delta T_{IB,c}$+$\Delta T_{C,c}$+$\Delta T_{RxSRS}$, P-$MPR_c$)."

For example, "MAX(MAX($MPR_c$,A-$MPR_c$)+$\Delta T_{IB,c}$+$\Delta T_{C,c}$+$\Delta T_{RxSRS}$,P-$MPR_c$)" may be used for single-band operation of NR stand-alone, and "MAX($MPR_c$+A-$MPR_c$+$\Delta T_{IB,c}$+$\Delta T_{C,c}$+$\Delta T_{RxSRS}$,P-$MPR_c$)" may be used for EN-DC/NE-DC operation.

The conditions of application and the content of the equation above are only examples. The method of determining the maximum transmission power based on the "total power reduction value without the power reduction value for adjustment of power class" described in this embodiment is applicable to various systems including NR CA and the like.

The $P_{EMAX,c}$ in the above-described equation is the maximum transmission power value notified from the base station apparatus 10 to the user terminal 20 and is a value of p-Max or a value of additionalPmax in the NR-NS-PmaxList (Non-Patent Document 2).

The $P_{PowerClass}$ (maximum transmission power value based on power class) is the maximum transmission power value of the user terminal corresponding to the power class defined in Non-Patent Document 1. For example, for a user terminal of power class 2, $P_{PowerClass}$=26 dBm, and for a user terminal of power class 3, $P_{PowerClass}$=23 dBm.

When the user terminal 20 complies with an existing specification, the user terminal 20 determines $\Delta P_{PowerClass}$ according to the following rule (excerpt from Non-Patent Document 1).

"$\Delta P_{PowerClass}$=3 dB for a power class 2 capable UE when P-max of 23 dBm or lower is indicated; or when the field of UE capability maxUplinkDutyCycle is absent and the percentage of uplink symbols transmitted in a certain evaluation period is larger than 50%; or when the field of UE capability maxUplinkDutyCycle is not absent and the percentage of uplink symbols transmitted in a certain evaluation period is larger than maxUplinkDutyCycle as defined in TS 38.331 (The exact evaluation period is no less than one radio frame); otherwise ΔPPowerClass=0 dB". That is, in the case where the user terminal 20 notifies maxUplinkDutyCycle as capability information, when a ratio of uplink symbols (=UplinkDutyCycle, transmission frequency) according to scheduling from the base station apparatus 10 exceeds maxUplinkDutyCycle, the user terminal 20 of the power class 2 complying with the existing specification assumes $\Delta P_{PowerClass}$=3 dB. If maxUplinkDutyCycle is not notified, $\Delta P_{PowerClass}$=3 dB if the ratio of uplink symbols exceeds 50%.

The above operation means that power class 2 falls back to power class 3 at the user terminal 20 when the uplink transmission frequency is high. This is an operation considering SAR (specific absorption rate) and heat generation in the user terminal.

The maxUplinkDutyCycle is one of the capability information notified from the user terminal 20 to the base station apparatus 10. The maxUplinkDutyCycle is notified for each band in a single band, and is notified for each band combination in a case in which a band combination is used, such as Intra band EN-DC.

The parameters of the above-described equation will be described below, but the specific values and application examples described below are only examples.

In the above equation, $\Delta T_{IB,c}$ is a relaxation value (power reduction value) of the maximum transmission power referred to if necessary when using a band combination.

$\Delta T_{C,c}$ is a relaxation value (power reduction value) of a transmission power in band edge transmission. It is 1.5 dB in the case of a specific condition, and $\Delta T_{C,c}$=0 in the case in which the specific condition is not applied.

$MPR_c$ is the maximum output power reduction value allowed in a serving cell c. As described in Non-Patent Document 1, a reduction of up to 6.5 dB as $MPR_c$ is allowed when user terminals of both power class 2 and power class 3 execute 256 QAM as a modulation scheme.

$A\text{-}MPR_c$ is an additional MPR permitted in the serving cell c, and the user terminal 20 can apply the A-MPR corresponding to a value (additionalSpectrumEmission) signalled from the base station apparatus 10.

$\Delta T_{RxSRS}$ is a relaxation value (power reduction value) related to SRS transmission and can be applied when a specific SRS transmission is performed, and $\Delta T_{RxSRS}$=0 when no specific SRS transmission is performed. P-MPR$_c$ is the maximum power reduction value allowable for the user terminal and can be applied when a specific condition is met. When a specific condition is not met, P-MPR$_c$=0.

Note that, the maximum transmission power value ($P_{CMAX,f,c}$) between the lower limit value and the upper limit value in equation 1 is used as the maximum transmission power value when the user terminal 20 performs PUSCH transmission, etc., as described in 7.1.1 of Non-Patent Document 3, for example. That is, even when the transmission power value calculated on the basis of the number of allocated resource blocks, the power control, or the like is larger than the maximum transmission power value ($P_{CMAX,f,c}$), the user terminal 20 performs transmission using the maximum transmission power value ($P_{CMAX,f,c}$).

(On Problems)

There is a problem in that the user terminal 20 operating in accordance with the existing provisions (e.g., Non-Patent Document 1) will be allowed to reduce power unnecessarily. Specifically, it is as follows. Hereafter, the word "Power-Class" may be described as "PC".

As described above, when 256 QAM is used in uplink transmission for both user terminals of PC3 and PC2, the allowable value for MPR is 6.5 dB. This MPR does not take SAR into account, but it is a power reduction allowable in order to satisfy the standard that would be difficult to satisfy if 256QAM transmission is performed, such as Emission and EVM (Error Vector Magnitude).

Accordingly, the user terminal of PC3 is allowed to transmit by reducing transmission power to 16.5 dBm (23−6.5), and the user terminal of PC2 is allowed to transmit by reducing transmission power to 19.5 dBm (26−6.5). In addition, as described above, when the user terminal of PC2 performs uplink transmission by a dutycycle exceeding the maxuplink dutycycle, the user terminal of PC2 falls back to PC3 and is allowed to transmit at 26−3=23 dBm.

Therefore, when the user terminal of PC2 performs uplink transmission by dutycycle exceeding maxuplink dutycycle when using 256 QAM, both the above-described power reduction of 6.5 dB and 3 dB are applied, so that transmission power of 26−6.5−3=16.5 dBm is allowed. The situation of this case is shown in FIG. 3(b).

However, as noted above, the user terminal 20 of PC2 is allowed to transmit by reducing power to 19.5 dBm for using uplink 256 QAM, and thus it is not necessary to further reduce the power of 3 dB for fallback under this condition. That is, as shown in FIG. 3(a), it is not necessary to apply the power reduction of 3 dB applied in FIG. 3(b).

The existing provisions also state that $\Delta P_{PowerClass}$=3 dB is applied when P-Max ($P_{EMAX,c}$ in Equation 2) is 23 dBm or less. In this case, when the power reduction value such as MPR is large, the possibility of excessive power reduction is high.

Hereinafter, Example 1, Example 2, and other examples will be described as operation examples of the user terminal 20 for solving the problem of allowing the maximum transmission power value to be unnecessarily low by applying both the power reduction of the fall back portion from PC2 to the PC3 and the other power reduction.

Example 1

In Example 1, the user terminal 20 of PC2 determines the maximum transmission power value ($P_{CMAX,f,c}$) according to the following equations 1 to 3, which are the same as equations 1 to 3 described before, as an example. The process of Example 1 is applied when the P-Max ($P_{EMAX,c}$ in Equation 2) is 23 dBm or more and the dutycycle of UL exceeds the maxULdutycycle. Such an application condition is an example and is not limited to such an application condition.

$$P_{CMAX\_L,f,c} \leq P_{CMAX,f,c} \leq P_{CMAX\_H,f,c} \quad \text{(Equation 1)}$$

$$P_{CMAX\_L,f,c} = \text{MIN}\{P_{EMAX,c} - \Delta T_{C,c} - (P_{PowerClass} - \Delta P_{PowerClass}) - \text{MAX}(\text{MAX}(MPR_c, A\text{-}MPR_c) + \Delta T_{IB,c} + \Delta T_{C,c} + \Delta T_{RxSRS}, P\text{-}MPR_c)\} \quad \text{(Equation 2)}$$

$$P_{CMAX\_H,f,c} = \text{MIN}\{P_{EMAX,c}, P_{PowerClass} - \Delta P_{PowerClass}\} \quad \text{(Equation 3)}$$

In Example 1, $\Delta P_{PowerClass}$ in equation 2 above is determined by a flowchart procedure in FIG. 4.

In S101, the user terminal 20 calculates "MAX(MAX(MPR$_c$, A-MPR$_c$)+$\Delta T_{IB,c}$+$\Delta T_{C,c}$+$\Delta T_{RxSRS}$, P-MPR$_c$)" in "($P_{PowerClass} - \Delta P_{PowerClass}$)−MAX(MAX (MPR$_c$,A-MPR$_c$)+$\Delta T_{IB,c}$+$\Delta T_{C,c}$+$\Delta T_{RxSRS}$,P-MPR$_c$)" in Equation 2.

Since "MAX(MAX (MPR$_c$,A-MPR$_c$)+$\Delta T_{IB,c}$+$\Delta T_{C,c}$+$\Delta T_{RxSRS}$,P-MPR$_c$)" is a value (total value) for reducing power excluding $\Delta P_{PowerClass}$ r this is referred to for convenience as "a total value of power reduction without power reduction value for adjusting power class." This may be referred to as a "total power reduction value that does not depend on uplink transmission frequency." This may also be referred to as a "total value of power reduction."

Also, $\Delta P_{PowerClass}$ may be referred to as "power reduction value for adjustment of power class" or "power reduction value depending on uplink transmission frequency."

If A-MPR$_c$=0, P-MPR$_c$=0, $\Delta T_{IB,c}$=0, $\Delta T_{C,c}$=0, and $\Delta T_{RxSRS}$=0, in the case where UL transmission of 256 QAM is scheduled in a slot subject to calculation of the maximum transmission power at the user terminal 20, the user terminal 20 of PC2 determines MPR$_c$=6.5 dB and calculates "total value of power reduction not including power reduction value for adjustment of power class"=6.5 dB.

In S102, the user terminal 20 determines whether or not the "total value of power reduction that does not include the power reduction value for adjusting power class" is larger than 3 dB (it may be whether or not it is 3 dB or more).

When the determination of S102 is Yes (in the case of "the total value of power reduction without including the power reduction value for adjusting power class">3 dB), in step 103, the user terminal 20 determines the lower limit ($P_{CMAX\_L,f,c}$) of the maximum transmission power by $\Delta P_{PowerClass}$=0 dB according to Equation 2. In addition, the user terminal 2 calculates the upper limit value ($P_{CMAX\_H,f,c}$) of the maximum transmission power by $\Delta P_{PowerClass}$=0 dB in the calculation of Equation 3. The user terminal 20 performs uplink transmission using the maximum transmission power value ($P_{CMAX,f,c}$) within the range between the lower limit value of the maximum transmission power and the upper limit value of the maximum transmission power obtained in Equations 2 and 3 based on Equation 1. In this specification, "> (greater than)" may be replaced by "≥ (equal to or greater than". Also, "< (less than)" may be replaced with "≤ (equal to or less than)".

Note that, in the above example, when the determination of S102 is Yes (when "the total value of power reduction without power reduction value for adjusting power class" is >3 dB), $\Delta P_{PowerClass}$=0 dB is applied to both the lower limit value ($P_{CMAX\_L,f,c}$) of the maximum transmission power and the upper limit value ($P_{CMAX\_H,f,c}$) of the maximum transmission power, but $\Delta P_{PowerClass}$=0 dB may be applied only to the lower limit value ($P_{CMAX\_L,f,c}$) of the maximum transmission power. When $\Delta P_{PowerClass}$=0 dB is applied only to the lower limit ($P_{CMAX\_L,f,c}$) of the maximum transmission power, the $\Delta P_{PowerClass}$ in the calculation of the upper limit ($P_{CMAX\_H,f,c}$) of the maximum transmission power may be determined, for example, according to the existing specification (e.g. Non-patent Document 1).

Then the determination of S102 is NO (when "the total value of power reduction without including the power reduction value for adjusting power class" is ≤3 dB), in S104, the user terminal 20 determines $\Delta P_{PowerClass}$ according to the existing specification (for example, Non-Patent Document 1), calculates the lower limit value and the upper limit value of the maximum transmission power based on the determined $\Delta P_{PowerClass}$, and performs uplink transmission using the maximum transmission power value ($P_{CMAX,f,c}$) within the range of the lower limit value and the upper limit value of the maximum transmission power.

According to the Example 1, when the "total value of power reduction without including the power reduction value for adjusting power class" exceeds 3 dB, the power reduction value for power class adjustment is set to 0 dB. Therefore, the problem of allowing unnecessary power reduction as shown in FIG. 3(b) is solved.

Example 2

Example 2 is a modification of S104 in Example 1. Except for S104, Example 1 and Example 2 are the same. Example 2 is also applied when P-Max ($P_{EMAX,c}$) is 23 dBm or more and the dutycycle of UL is greater than the maxULduty-cycle. Such an application condition is an example and is not limited to such an application condition.

When proceeding to S104, i.e., when "total value of power reduction without including power reduction value for adjusting power class" ≤3 dB", the user terminal 20 determines $\Delta P_{PowerClass}$ by the following equation 4.

$$\Delta P_{PowerClass} = 3 - \text{MAX}(\text{MAX}(MPR_c, A\text{-}MPR_c) + \Delta T_{IB,c} + \Delta T_{C,c} + \Delta T_{RxSRS}, P\text{-}MPR_c) \qquad \text{(Equation 4)}$$

That is, the user terminal 20 determines the value obtained by subtracting "the total value of power reduction that does not include the power reduction value for adjusting the power class" from the value of 3 as $\Delta P_{PowerClass}$.

For example, when "MAX(MAX(MPR$_c$,A-MPR$_c$)+$\Delta T_{IB,c}$+$\Delta T_{C,c}$+$\Delta T_{RxSRS}$,P-MPR$_c$), which is the "total value of power reduction without including the power reduction value for adjusting power class" is 2 dB, $\Delta P_{PowerClass}$=3−2=1.

More specifically, as shown in FIG. 5, in the case where "MAX(MAX(MPR$_c$,A-MPR$_c$)+$\Delta T_{IB,c}$+$\Delta T_{C,c}$+$\Delta T_{RxSRS}$,P-MPP$_c$)", which is the "total value of power reduction without including the power reduction value for adjusting power class", is "0 dB, 1 dB, 2 dB, 3 dB, respectively, $\Delta P_{PowerClass}$ is calculated as 3 dB, 2 dB, 1 dB, 0 dB.

The user terminal 20 determines the lower limit value ($P_{CMAX\_L,f,c}$) of the maximum transmission power by Equation 2 using $\Delta P_{PowerClass}$ determined using Equation 4. In the calculation of Equation 3, the user terminal 20 calculates the upper limit value ($P_{CMAX\_H,f,c}$) of the maximum transmission power using $\Delta P_{PowerClass}$ determined using Equation 4. The user terminal 20 performs uplink transmission using the maximum transmission power value ($P_{CMAX,f,c}$) within the range of the lower limit value of the maximum transmission power and the upper limit value of the maximum transmission power obtained by Equations 2 and 3 based on Equation 1.

In the above example, $\Delta P_{PowerClass}$ determined by applying Equation 4 to both the lower limit value ($P_{CMAX\_L,f,c}$) of the maximum transmission power and the upper limit value ($P_{CMAX\_H,f,c}$) of the maximum transmission power is applied, but $\Delta P_{PowerClass}$ determined by applying Equation 4 may be applied only to the lower limit value ($P_{CMAX\_L,f,c}$) of the maximum transmission power. When $\Delta P_{PowerClass}$ determined by applying Equation 4 is applied only to the lower limit value ($P_{CMAX\_L,f,c}$) of the maximum transmission power, the $\Delta P_{PowerClass}$ in the calculation of the upper limit value ($P_{CMAX\_H,f,c}$) of the maximum transmission power may be determined, for example, according to the existing specification (e.g., Non-Patent Document 1).

Also in Example 2, the problem of unnecessarily allowing reduction of the maximum transmission power value is solved. Further, in Example 2, particularly in the case where "the total value of power reduction without including the power reduction value for adjusting the power class" is ≤3 dB, a more appropriate maximum transmission power value can be calculated.

As described above, Example 1 and Example 2 are applied when P-Max ($P_{EMAX,c}$) is 23 dBm or more and the dutycycle of UL is greater than the maxULdutycycle.

When P-Max ($P_{EMAX,c}$) is 23 dBm or more and UL dutycycle is maxULdutycle or less, $\Delta P_{PowerClass}$=0 dB. If P-Max ($P_{EMAX,c}$) is less than 23 dBm, $\Delta P_{PowerClass}$— 0 dB.

Summary

The above description is summarized as below.

(1) If P-Max is greater than or equal to 23 dBm and dutycycle is greater than maxULdutycycle:
When MAX(MAX (MPR$_c$,A-MPR$_c$)+$\Delta T_{IB,c}$+$\Delta T_{C,c}$+$\Delta T_{RxSRS}$,P-MPR$_c$)≤3 dB, $\Delta P_{Powerclass}$=3−MAX(MAX (MPR$_c$,A-MPR$_c$)+$\Delta T_{IB,c}$+$\Delta T_{C,c}$+$\Delta T_{RxSRS}$,P-MPR$_c$) dB
When MAX(MAX (MPR$_c$,A-MPR$_c$)+$\Delta T_{IB,c}$+$\Delta T_{C,c}$+$\Delta T_{RxSRS}$,P-MPR$_c$)>3 dB, $\Delta P_{Powerclass}$=0 dB (2) If P-Max is 23 dBm or more and dutycycle of UL is maxULdutycycle or less:
$\Delta P_{Powerclass}$=0 dB (3) If P-Max is less than 23 dBm:
$\Delta P_{powerclass}$=0 dB Note that, $\Delta P_{powerclass}$ calculated by the rules (1) to (3) above may be applied to both $P_{CMAX\_L,f,c}$ and $P_{CMAX\_H,f,c}$, or only to $P_{CMAX\_L,f,c}$.

Other Examples

Example 1 and Example 2 described above are examples assuming $P_{PowerClass}$=26 dBm in PC2 and $P_{PowerClass}$=23 dBm in PC3.

More generally, for example, assuming that there are PowerClass X (PCx) and PowerClass Y (PCy), $P_{PowerClass}$=PXdBm for PCx, $P_{PowerClass}$=PYdBm for PCy, and PX−PY=ΔPXY. ΔPXY may be referred to as "power reduction value when falling back from PowerClass X to PowerClass Y." This power reduction value may be referred to as a predetermined value.

At this time, the user terminal 20 determines the $\Delta P_{PowerClass}$ as shown below and determines the maximum transmission power according to Equations 1 to 3. In Examples 1 and 2, PX=26 dBm, PY=23 dBm, and ΔPXY=3 dB.

(1) If P-Max is equal to or greater than PY and dutycycle is greater than maxULdutycycle:
For MAX(MAX (MPR$_c$,A-MPR$_c$)+$\Delta T_{IB,c}$+$\Delta T_{C,c}$+$\Delta T_{RxSRS}$, P-MPR$_c$)≤ΔPXY, $\Delta P_{powerclass}$=ΔPXY− MAX(MAX (MPR$_c$,A-MPR$_c$)+$\Delta T_{IB,c}$+$\Delta T_{C,c}$+$\Delta T_{RxSRS}$,P-MPR$_c$) dB
When MAX(MAX (MPR$_c$,A-MPR$_c$)+$\Delta T_{IB,c}$+$\Delta T_{C,c}$+$\Delta T_{RxSRS}$,P-MPR$_c$)>ΔPXY, $\Delta P_{powerclass}$=0 dB (2) When P-Max is PYdBm or higher and UL dutycycle is maxULdutycl or lower:
$\Delta P_{powerclass}$=0 dB (3) If P-Max is less than PY:
$\Delta P_{powerclass}$=0 dB Note that, $\Delta P_{powerclass}$ calculated by the rules (1) to (3) above may be applied to both $P_{CMAX\_L,f,c}$ and $P_{CMAX\_H,f,c}$, or only to $P_{CMAX\_L,f,c}$.

In addition, the method of determining the maximum transmission power value according to this embodiment can be applied also to a CA (regardless of Inter or intra). That is, the method of determining the maximum transmission power value according to this embodiment is applicable to any of LTE CA (LTE FDD+LTE FDD, LTE FDD+LTE TDD, LTE TDD+LTE TDD) or NR CA (NR FDD+NR FDD, NR FDD+NR TDD, NR TDD+NR TDD). These CA configurations are examples. A method for determining the maximum transmission power value according to the present embodiment can be applied to CA other than the above.

The method of determining the maximum transmission power value according to this embodiment is applicable also to DC (regardless of Inter or intra). That is, the method of determining the maximum transmission power value according to this embodiment is applicable to any of LTE DC(LTE FDD+LTE FDD, LTE FDD+LTE TDD, LTE TDD+LTE TDD), NR DC(NR FDD+NR FDD, NR FDD+NR TDD, NR TDD+NR TDD), LTE+NR DC(EN-DC)) (LTE FDD+NR FDD, LTE FDD+NR TDD, LTE TDD+NR TDD, LTE TDD+NR FDD). These DC configurations are examples. A method for determining the maximum transmission power value according to the present embodiment can be applied to DC other than the above.

The method of determining the maximum transmission power value according to this embodiment is applicable to any power lass. For example, in addition to the PC2, the method can be also applied to a power class in which the maximum transmission power value is 29 dBm.

(Equipment Configuration)

Next, a functional configuration example of the base station apparatus 10 and the user terminal 20 that perform the processing and operations described above will be described.

<Base Station Apparatus 10>

FIG. 6 is a diagram illustrating an example of a functional configuration of the base station apparatus 10. As shown in FIG. 6, the base station apparatus 10 includes a transmission unit 110, a reception unit 120, a configuration unit 130, and a control unit 140. The functional configuration shown in FIG. 6 is only one example. As long as the operation according to the embodiments of the present invention can be performed, the functional category and the name of the functional unit may be any one. The transmission unit 110 and the reception unit 120 may be collectively referred to as a communication unit.

The transmission unit 110 includes a function for generating a signal to be transmitted to the user terminal 20 side and transmitting the signal wirelessly. The receiving unit 120 includes a function for receiving various signals transmitted from the user terminal 20 and acquiring, for example, information of a higher layer from the received signals. The transmission unit 110 has a function to transmit NR-PSS, NR-SSS, NR-PBCH, and DL/UL control signals, DCI by PDCCH, data by PDSCH, and the like to the user terminal 20.

The configuration unit 130 stores preconfigured configuration information and various configuration information to be transmitted to the user terminal 20 in the storage device provided by the configuration unit 130 and reads the pre-configured configuration information from the storage device as necessary.

The control unit 140 schedules the DL reception or UL transmission of the user terminal 20 through the transmission unit 110. A functional unit related to signal transmission in the control unit 140 may be included in the transmission unit 110, and a functional unit related to signal reception in the control unit 140 may be included in the receiving unit 120. The transmission unit 110 may be called a transmitter, and the reception unit 120 may be called a receiver.

<User Terminal 20>

FIG. 7 is a diagram illustrating an example of the functional configuration of the user terminal 20. As shown in FIG. 7, the user terminal 20 includes a transmission unit 210, a reception unit 220, a configuration unit 230, and a control unit 240. The functional configuration shown in FIG. 7 is only one example. As long as the operation according to the embodiments of the present invention can be performed, the functional category and the name of the functional unit may be any one. The transmission unit 210 and the reception unit 220 may be collectively referred to as a communication unit. The user terminal 20 may be referred to as a terminal.

The transmission unit 210 creates a transmission signal from the transmission data and wirelessly transmits the transmission signal. The transmission unit 210 performs uplink transmission (for example: data transmission by PUSCH, preamble transmission by PRACH, and control information transmission by PUCCH) using the maximum transmission power value determined using the method of determining the maximum transmission power value described according to the present embodiment. The receiving unit 220 receives various signals wirelessly and acquires signals from higher layers from the received signal of the physical layer. The reception unit 220 has a function to receive the NR-PSS, NR-SSS, NR-PBCH, and DL/UL/SL control signals transmitted from the base station apparatus 10, the DCI by the PDCCH, data by the PDSCH, and the like. For example, the transmission unit 210 may transmit PSCCH (Physical Sidelink Control Channel), PSSCH (Physical Sidelink Shared Channel), PSDCH (Physical Sidelink Discovery Channel), PSBCH (Physical Sidelink Broadcast Channel), etc. to another user terminal 20 as D2D communication, and the receiving unit 120 may receive PSCCH, PSSCCH, PSDCH, PSDCH, or PSBCH, etc. from another user terminal 20.

The configuration unit 230 stores various configuration information received from the base station apparatus 10 or other user terminals by the receiving unit 220 in a storage device provided by the setting unit 230 and reads it from the storage device as necessary. The configuration unit 230 also stores preconfigured configuration information.

The control unit 240 performs control of the user terminal 20. The control unit 240 performs the determination of the maximum transmit power value according to this embodiment. A functional unit related to signal transmission in the control unit 240 may be included in the transmission unit 210, and a functional unit related to signal reception in the control unit 240 may be included in the reception unit 220. The transmission unit 210 may be referred to as a transmitter, and the reception unit 220 may be referred to as a receiver.

Summary

According to the present embodiment, at least the terminals and uplink transmission method shown in the following items 1 to 4 are provided.

(Item 1)

A terminal including
a control unit configured to compare a power reduction total value that is reduced from a maximum transmission power value determined based on a power class and that does not include a power reduction value for adjusting the power class with a predetermined value, and
to calculate a lower limit value of a maximum transmission power by setting the power reduction value for adjusting the power class as 0 dB when the power reduction total value is greater than the predetermined value; and
a transmission unit configured to perform uplink transmission using a maximum transmission power value equal to or greater than the lower limit value.

(Item 2)

The terminal as described in item 1, wherein, when the power reduction total value is greater than the predetermined value, the control unit calculates an upper limit value of a maximum transmission power by setting the power reduction value for adjusting the power class as 0 dB.

(Item 3)

The terminal as described in item 1 or 2, wherein, when the power reduction total value is equal to or less than the predetermined value, the control unit calculates, as a value of the power reduction value, a value obtained by subtracting the power reduction total value from the predetermined value.

(Item 4)

An uplink transmission method executed by a terminal, the method including:
a step of comparing a power reduction total value that is reduced from a maximum transmission power value determined based on a power class and that does not include a power reduction value for adjusting the power class with a predetermined value, and calculating a lower limit value of a maximum transmission power by setting the power reduction value for adjusting the power class as 0 dB when the power reduction total value is greater than the predetermined value; and
a step of performing uplink transmission using a maximum transmission power value equal to or greater than the lower limit value.

Any of the items 1-4 provide a technique for preventing the maximum transmit power value of a user terminal from being unnecessarily reduced in a wireless communication system.

(Hardware Configuration)

The block diagrams (FIG. 6 and FIG. 7) used in the description of the embodiment described above illustrate the block of functional unit. Such function blocks (configuration parts) are attained by at least one arbitrary combination of hardware and software. In addition, an attainment method of each of the function blocks is not particularly limited. That is, each of the function blocks may be attained by using one apparatus that is physically or logically coupled, by directly or indirectly (for example, in a wired manner, over the radio, or the like) connecting two or more apparatuses that are physically or logically separated and by using such a plurality of apparatuses. The function block may be attained by combining one apparatus described above or a plurality of apparatuses described above with software.

The function includes determining, determining, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmitting unit or the transmitter. As described above, the attainment method thereof is not particularly limited.

For example, the base station apparatus 10, the user terminal 20, and the like in one embodiment of this disclosure may function as a computer for performing the processing of a radio communication method of this disclosure. FIG. 8 is a diagram illustrating an example of a hardware configuration of the base station apparatus 10 and the user terminal 20 according to one embodiment of this disclosure. The base station apparatus 10 and the user terminal 20 described above may be physically configured as a computer apparatus including a processor 1001, a storage unit 1002, an auxiliary storage unit 1003, a communication unit 1004, an input unit 1005, an output unit 1006, a bus 1007, and the like.

Note that, in the following description, the word "apparatus" can be replaced with a circuit, a device, a unit, or the like. The hardware configuration of the base station apparatus 10 and the user terminal 20 may be configured to include one or a plurality of apparatuses illustrated in the drawings, or may be configured not to include a part of the apparatuses.

Each function of the base station apparatus 10 and the user terminal 20 is attained by reading predetermined software (a program) is read on hardware such as the processor 1001 and the storage unit 1002 such that the processor 1001 performs an operation, and by controlling the communication of the communication unit 1004 or by controlling at least one of reading and writing of data in the storage unit 1002 and the auxiliary storage unit 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be attained by the processor 1001.

In addition, the processor 1001 reads out a program (a program code), a software module, data, and the like to the storage unit 1002 from at least one of the auxiliary storage unit 1003 and the communication unit 1004, and thus, executes various processings. A program for allowing a computer to execute at least a part of the operation described in the embodiment described above is used as the program. For example, the control unit 140 of the base station apparatus 10 illustrated in FIG. 19 may be attained by a control program that is stored in the storage unit 1002 and is operated by the processor 1001. In addition, for example, the control unit 240 of the user terminal 20 illustrated in FIG. 20 may be attained by a control program that is stored in the storage unit 1002 and is operated by the processor 1001. It has been described that the various processings described above are executed by one processor 1001, but the processings may be simultaneously or sequentially executed by two or more processors 1001. The processor 1001 may be mounted on one or more chips. Note that, the program may be transmitted from a network through an electric communication line.

The storage unit 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage unit 1002 may be referred to as a register, a cache, a main memory (a main storage unit), and the like. The storage unit 1002 is capable of retaining a program (a program code) that can be executed in order to implement a communication method according to one embodiment of this disclosure, a software module, and the like.

The auxiliary storage unit 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The auxiliary storage unit 1003 may be referred to as an auxiliary storage unit. The storage medium described above, for example, may be a database including at least one of the storage unit 1002 and the auxiliary storage unit 1003, a server, and a suitable medium.

The communication unit 1004 is hardware for performing communication with respect to the computer through at least one of a wire network and a radio network (a transmitting and receiving device), and for example, is also referred to as a network device, a network controller, a network card, a communication module, and the like. The communication unit 1004, for example, may be configured by including a high frequency switch, a duplexer, a filter, a frequency synthesizer, and the like, in order to attain at least one of frequency division duplex (FDD) and time division duplex (TDD). For example, a transmitting and receiving antenna, an amplifier, a transmitting and receiving unit, a transmission path interface, and the like may be attained by the communication unit 1004. In the transmitting and receiving unit, the transmitting unit and the receiving unit are mounted by being physically or logically separated.

The input unit 1005 is an input device for receiving input from the outside (for example, a keyboard, a mouse, a microphone, a switch, a button, a sensor, and the like). The output unit 1006 is an output device for implementing output with respect to the outside (for example, a display, a speaker, an LED lamp, and the like). Note that, the input unit 1005 and the output unit 1006 may be integrally configured (for example, a touch panel).

In addition, each of the apparatuses such as the processor 1001 and the storage unit 1002 may be connected by the bus 1007 for performing communication with respect to information. The bus 1007 may be configured by using a single bus, or may be configured by using buses different for each of the apparatuses.

In addition, the base station apparatus 10 and the user terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be attained by the hardware. For example, the processor 1001 may be mounted by using at least one of the hardware.

(Supplement to Embodiment)

As described above, the embodiment of the invention has been described, but the disclosed invention is not limited to the embodiment, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station apparatus 10 and the user terminal 20 have been described by using a functional block diagram, but such an apparatus may be attained by hardware, software, or a combination thereof. Each of software that is operated by a processor of the base station apparatus 10 according to the embodiment of the invention and software that is operated by a processor of the user terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable recording media.

In addition, the notification of the information is not limited to the aspect/embodiment described in this disclosure, and may be performed by using other methods. For example, the notification of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Here, a specific operation that is performed by the base station apparatus 10 may be performed by an upper node, in accordance with a case. In a network provided with one or a plurality of network nodes including the base station apparatus 10, it is obvious that various operations that are performed in order for communication with respect to the user terminal 20 can be performed by at least one of the base station apparatus 10 and network nodes other than the base station apparatus 10 (for example, MME, S-GW, or the like is considered as the network node, but the network node is not limited thereto). In the above description, a case is exemplified in which the number of network nodes other than the base station apparatus 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The information or the like that is input and output may be retained in a specific location (for example, a memory), or may be managed by using a management table. The information or the like that is input and output can be subjected to overwriting, updating, or editing. The information or the like that is output may be deleted. The information or the like that is input may be transmitted to the other apparatuses.

Judgment in this disclosure may be performed by a value represented by 1 bit (0 or 1), may be performed by a truth-value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not a limited name in any respect. Further, expressions or the like using such parameters may be different from those explicitly disclosed in this disclosure. Various channels (for example, PUSCH, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station apparatus", "fixed station", "NodeB", "eNodeB (eNB)", "gNodeB (gNB)", "access point", "transmission point", "reception point", "transmission and reception point", "cell", "sector", "cell group", "carrier", "component carrier", and the like can be interchangeably used. The base station may be referred to by a term such as a macrocell, a small cell, a femtocell, and a picocell.

The base station is capable of accommodating one or a plurality of (for example, three) cells. In a case where the base station accommodates a plurality of cells, the entire coverage area of the base station can be classified into a plurality of small areas, and each of the small areas is capable of providing communication service by a base station sub-system (for example, an indoor type small base station (a remote radio head (RRH)). The term "cell" or "sector" indicates a part of the coverage area or the entire coverage area of at least one of the base station and the base station sub-system that perform the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication unit, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved at the time of a communication operation. For example, at least one of the base station and the mobile station may be an internet of things (IoT) device such as a sensor.

In addition, the base station apparatus in this disclosure may be replaced with the user terminal. For example, each aspect/embodiment of this disclosure may be applied to a configuration in which communication between the base station apparatus and the user terminal is replaced with communication in a plurality of user terminals 20 (for example, may be referred to as device-to-device (D2D), vehicle-to-everything (V2X), and the like). In this case, the function of the base station apparatus 10 described above may be provided in the user terminal 20. In addition, the words "up", "down", and the like may be replaced with words corresponding to the communication between the terminals (for example, "side"). For example, an up channel, a down channel, and the like may be replaced with a side channel.

Similarly, the user terminal in this disclosure may be replaced with the base station apparatus. In this case, the function of the user terminal described above may be provided in the base station apparatus.

The terms "determining" and "determining" used in this disclosure may involve diverse operations. "Determining" and "determining", for example, are capable of including "determining" and "determining" with respect to judging, calculating, computing, processing, deriving, investigating, looking up (search, inquiry) (for example, looking up in a table, a database, or another data structure), and ascertaining, and the like. In addition, "determining" and "determining" are capable of including "determining" and "determining" with respect to receiving (for example, receiving information), transmitting (for example, transmitting information), input, output, and accessing (for example, accessing data in a memory), and the like. In addition, "determining" and "determining" are capable of including "determining" and "determining" with respect to resolving, selecting, choosing, establishing, comparing, and the like. That is, "determining" and "determining" are capable of including "determining" and "determining" with respect to any operation. In addition, "determining (determining)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical couple or connection, may be logical couple or connection, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot on the basis of a standard to be applied.

The description "on the basis of" that is used in this disclosure does not indicate "only on the basis of", unless otherwise specified. In other words, the description "on the basis of" indicates both "only on the basis of" and "at least on the basis of".

Any reference to elements using the designations "first," "second," and the like, used in this disclosure, does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other designations respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, 1 to 13 symbols), or may be a period longer than 1 ms. Note that, unit representing TTI may be referred to as a slot, a mini slot, and the like, but not a subframe. Also, one slot may be called a unit time. The unit time may be different in each cell according to numerology.

Here, TTI, for example, indicates minimum time unit of scheduling in radio communication. For example, in an LTE system, the base station performs scheduling for allocating a radio resource (a frequency bandwidth, transmission power, and the like that can be used in each of the user terminals 20) in TTI unit, with respect to each of the terminals 20. Note that, the definition of TTI is not limited thereto.

TTI may be transmission time unit of a data packet (a transport block), a code block, a codeword, and the like that are subjected to channel coding, or may be processing unit of scheduling, link adaptation, and the like. Note that, when TTI is applied, a time zone in which the transport block, the code block, the codeword, and the like are actually mapped (for example, the number of symbols) may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a common TTI (TTI in LTE Rel. 8-12), a normal TTI, a long TTI, a common subframe, a normal subframe, a long subframe, a slot, and the like. TTI shorter than the common TTI may be referred to as a shortened TTI, a short TTI, a partial TTI (or a fractional TTI), a shortened subframe, a short subframe, a mini slot, a subslot, a slot, and the like.

Note that, the long TTI (for example, the common TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be determined on the basis of the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a sub-carrier group (SCG), a resource element group (REG), a PRB pair, a RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it may not assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are respectively different from C". The terms "separated", "coupled", and the like may be interpreted as with "being different".

Each aspect/embodiment described in this disclosure may be independently used, may be used by being combined, or may be used by being switched in accordance with execution. In addition, the notification of predetermined information (for example, the notification of "being X") is not limited to being performed explicitly, and may be performed implicitly (for example, the notification of the predetermined information is not performed).

As described above, this disclosure has been described in detail, but it is obvious for a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

EXPLANATIONS OF LETTERS OR NUMERALS

10 BASE STATION APPARATUS
110 TRANSMITTING UNIT
120 RECEIVING UNIT
130 CONFIGURATION UNIT
140 CONTROL UNIT
20 USER TERMINAL
210 TRANSMITTING UNIT
220 RECEIVING UNIT
230 CONFIGURATION UNIT
240 CONTROL UNIT
1001 PROCESSOR
1002 STORAGE UNIT
1003 AUXILIARY STORAGE UNIT
1004 COMMUNICATION UNIT
1005 INPUT UNIT
1006 OUTPUT UNIT

The invention claimed is:

1. A terminal comprising:
a control unit configured
to compare a power reduction total value that is reduced from a maximum transmission power value determined based on a power class and that does not include a power reduction value for adjusting the power class with a predetermined value, and
to calculate a lower limit value of a maximum transmission power by setting the power reduction value for adjusting the power class as 0 dB when the power reduction total value is greater than the predetermined value; and
a transmission unit configured to perform uplink transmission using a maximum transmission power value equal to or greater than the lower limit value.

2. The terminal as claimed in claim 1, wherein, when the power reduction total value is greater than the predetermined value, the control unit calculates an upper limit value of a maximum transmission power by setting the power reduction value for adjusting the power class as 0 dB.

3. The terminal as claimed in claim 2, wherein, when the power reduction total value is equal to or less than the predetermined value, the control unit calculates, as a value of the power reduction value, a value obtained by subtracting the power reduction total value from the predetermined value.

4. The terminal as claimed in claim 1, wherein, when the power reduction total value is equal to or less than the predetermined value, the control unit calculates, as a value of the power reduction value, a value obtained by subtracting the power reduction total value from the predetermined value.

5. An uplink transmission method executed by a terminal, the method comprising:
a step of comparing a power reduction total value that is reduced from a maximum transmission power value determined based on a power class and that does not include a power reduction value for adjusting the power class with a predetermined value, and calculating a lower limit value of a maximum transmission power by setting the power reduction value for adjusting the power class as 0 dB when the power reduction total value is greater than the predetermined value; and
a step of performing uplink transmission using a maximum transmission power value equal to or greater than the lower limit value.

* * * * *